United States Patent Office 2,726,959
Patented Dec. 13, 1955

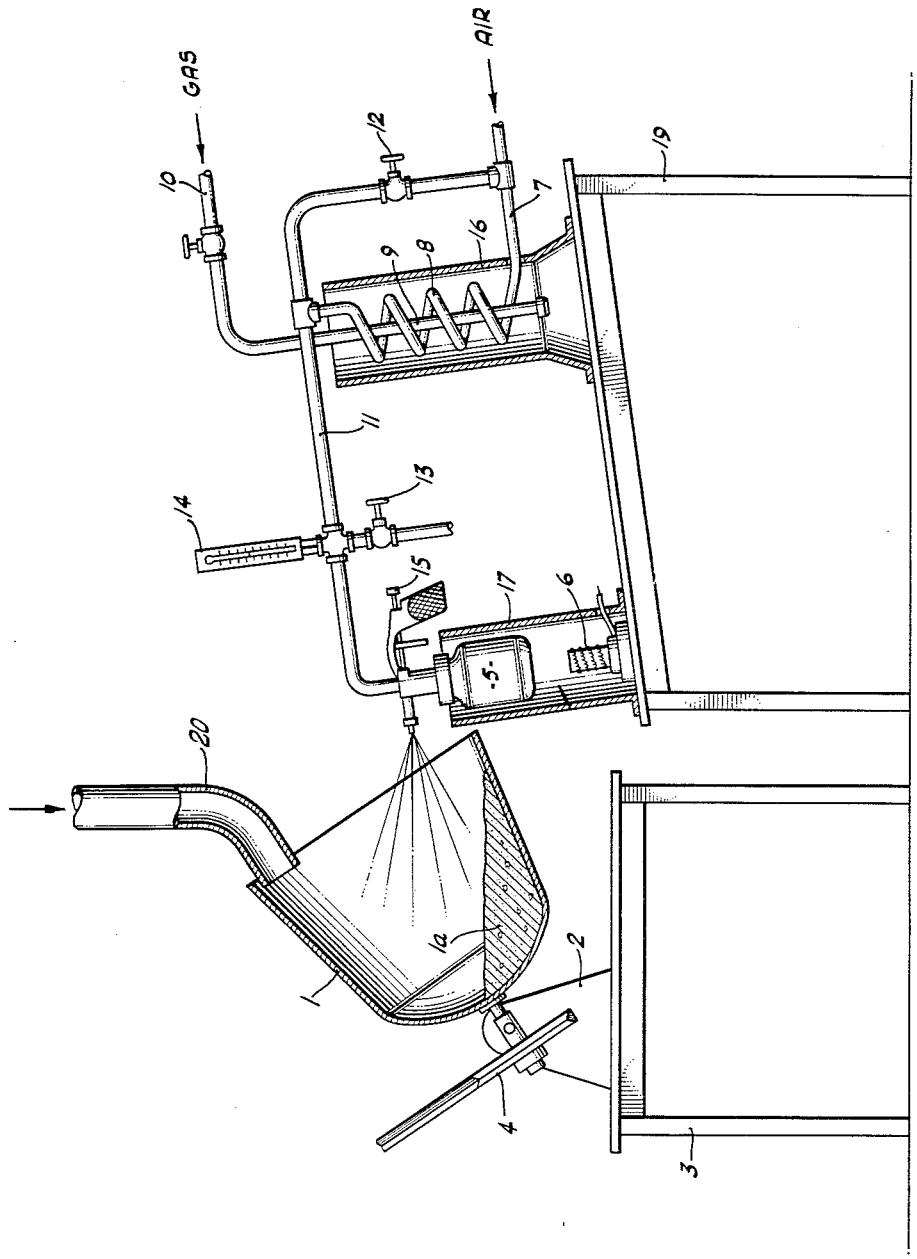

2,726,959

METHOD FOR PRODUCING MALTED MILK BALLS AND THE RESULTING PRODUCT

Channing H. Lushbough, Oconomowoc, Wis., and Paul G. Miller, West Orange, N. J., assignors to Carnation Company, Los Angeles, Calif., a corporation of Delaware Application November 15, 1952, Serial No. 320,784

7 Claims. (Cl. 99—134)

This invention relates to a process for binding together various types of food particles and more particularly for binding together of particles of any food product which is moisture absorbent and which must be preserved in an anhydrous or nearly anhydrous state, by means of an edible binding agent in the molten state.

In the past, various types of food particles have been bound together into various shapes and sizes by binding agents, but the keeping qualities of such products have been deficient since the food particles were permitted to absorb moisture during the binding process. The present invention is particularly adapted to the production of confectionary products which are comprised in a major portion of malted milk. In the production of malted milk balls, which consist essentially of a porous center of malted milk which has been chocolate coated, it is the present practice to first form the malt-containing material into a heavy dough with a small amount of water. The dough is then divided by mechanical means into small pieces or cubes which are expanded to several times their original volume by placing them in a vacuum oven. In the vacuum oven, the cubes of dough expand into a spherical shape and dry, giving a product having a dry, friable, porous structure. This porous friable structure is very desirable since when eaten it permits ready solubility. Without this porous structure the chocolate coating alone melts, leaving a dense piece of malted milk which dissolves comparatively slowly.

It has been found that a somewhat similar porous structure can be obtained in a relatively simple manner without going through the dough stage and without requiring the expensive vacuum drying step. By use of the present invention, particles of malted milk can be formed into balls or various other shapes by binding the particles together with an edible binding agent which is substantially free of moisture. These particles of malted milk are themselves somewhat porous, and further porosity is obtained because of the interstices between the particles of malted milk after they are formed into balls or other shapes. In order words, this porosity results from the characteristics of the particles of malted milk and from the number of channels between the individual particles. While the invention is particularly adapted to the production of malted milk confections, it is not limited thereto, since a general object of the invention is to produce various food products by binding together particles of moisture absorbent foods which are to be preserved in an anhydrous, or nearly anhydrous state.

In the process of the present invention, the starting material consists of coarse food particles of any type of moisture absorbent food and the binding agent is any edible composition which has a suitable temperature range between its melting point and temperature of decomposition so that the binding agent can be applied to the food particles while in the molten state. Preferably, the binding agent should be moisture free but any binding agent can be used which is low enough in moisture to have definite melting and solidifying properties and low enough in moisture so that the structure of the food particles being bound does not change. Examples of such binding agents include sugars or mixtures of sugars, with or without small quantities of water or other solvents, which have a suitable temperature range between the melting point and the temperature of rapid decomposition. Other binding agents of the type described include milk chocolate, paraffin wax, bees wax, hydrogenated vegetable oil and cheese wax.

In utilizing the present invention in the production of malted milk confections, the starting material is coarsely ground malted milk, either natural or chocolate flavor, the particles being preferably of such a size that they will pass at least through a 4 mesh Tyler screen but be retained on a 20 mesh Tyler screen. This product is known in the trade as "Crunch." In the preferred process, a quantity of this crunch is placed in a rotating pan such as is common in the confection trade. One form of apparatus used in the subject process is illustrated in the drawing wherein the rotating pan 1 is mounted by bracket 2 on supporting table 3. The rotating pan 1 is driven by pulley 4 connected to any suitable power source. A quantity of crunch 1a is placed in the pan and the pan is driven at a speed sufficient to cause rolling of the crunch particles. The binding agent, D-glucose monohydrate (dextrose) being chosen for this example, is placed in spray gun 5 and heated over an open flame until the dextrose has been melted. The spray gun is then assembled over the electric heater element 6 and held at a temperature of about 118 to 123 degrees centigrade. The compressed air supply to be used in connection with spray gun 5 enters conduit 7 and passes to the spiral section 8 which surrounds gas heater 9 supplied with gas by conduit 10. The heated compressed air passes from section 8 to pipe 11 which has a by-pass valve 12, an air bleed valve 13 and thermometer 14. A portion of the unheated air supply can be admitted without going through the gas heater by use of by-pass valve 12 and air can be bled through valve 13 until the air reaches proper spraying temperature as indicated by thermometer 14. The preferred spray air temperature for this example is 180 to 190 degrees centigrade. When this temperature is reached, the valve 15 on the spray gun can be opened to cause the dextrose to be sprayed onto the malted milk crunch while the pan 1 is rotating. The gas heater 9 and the electric heater element 6 are surrounded by shields 16 and 17 respectively in order to prevent unnecessary loss of heat, and these shields are mounted on standard 19 which also supports the electric heater element 6.

Prior to charging pan 1 with crunch for the production of malted milk balls, it is desirable to spray the inside of the pan with dextrose so that the charge will roll properly. Then, while the pan is being turned, the molten dextrose is carefully sprayed onto the crunch and small collections or agglomerates of crunch begin to form immediately. These collections are then brought up into the desired sized balls or spheres by alternately adding more crunch and spraying in more molten dextrose. However, any method of combining the crunch and dextrose can be used which results in the formation of proper sized balls or spheres. During the time the crunch particles are being bound together, a stream of air from conduit 20 is allowed to blow into the pan to control the rate at which the molten dextrose solidifies and to help keep out moisture. The temperature of this air stream can be varied to obtain the proper binding action in the pan, a temperature of approximately 90° C. being used for natural flavor crunch while only a slight amount of air at approximately 16° C. can be used for the chocolate flavored crunch.

The larger balls collect at the front of the pan due to the flared shape of the pan and are screened out as they reach the desired size. After cooling, the balls are ready for coating with chocolate in any well known manner and can then be waxed or glazed if desired to improve their appearance and keeping qualities. However, if it is desired to produce malted milk crunch bars, the molten dextrose is sprayed into a quantity of crunch in the rotating pan or in a stationary pan or bowl having some type of agitator as in a Hobart bowl until the entire lot of crunch is in a sticky, plastic state. This plastic mass is then removed from the pan and molded into individual bars or rolled into a sheet on a hot table and the sheet cut into bars. These bars can then be cooled and chocolate coated in any well known manner.

While the example set forth above utilizes malted milk crunch and a dextrose binding agent, the same process has been carried out utilizing a variety of types of food particles and a variety of binding agents. The following table illustrates other examples of food particles and binding agents which have been used successfully and also illustrates the preferred temperatures of the molten binding agent, the spray air and the air blast from conduit 20. These examples are merely illustrations of the scope of the process and the temperatures are not considered critical.

| Binding Agent | Bound Material | Binding Agent Temp. (°C.) | Spray Air Temp. (°C.) | Air Blast Temp. (°C.) |
|---|---|---|---|---|
| D-Levulose | Malted Milk Crunch Natural Flavor. | 105 | 180 | 120. |
| 95% Sucrose plus 5% D-Glucose Monohydrate. | -----do--------- | 170 | 190 | 140. |
| 95% Lactose plus 5% D-Glucose Monohydrate. | -----do--------- | 170 | 190 | 140. |
| 84% D-Glucose Monohydrate plus 16% corn syrup. | -----do--------- | 105 | 120 | 140. |
| Milk Chocolate | -----do--------- | 34 | 93 | 17. |
| Paraffin Wax (Edible) | -----do--------- | 55 | 110 | no air. |
| Bees' Wax (Edible) | -----do--------- | 70 | 95 | no air. |
| Hydrogenated Vegetable Oil. | -----do--------- | 40 | 95 | 20. |
| D-Glucose Anhydrous | -----do--------- | 159 | 190 | 120. |
| D-Glucose Monohydrate | Puffed Wheat | 120 | 190 | 75. |
| Do | Crushed Corn Flakes. | 120 | 190 | 75. |

In order to alter the flavor and composition of food particles which are to be formed into balls or molded pieces, other ingredients may be mixed in a dry state with the food particles in the rotating pan and these ingredients will be bound together in the same manner as the food particles by a molten, edible binding agent. Such other ingredients may include non-fat dry milk solids, cane sugar, corn syrup solids, dextrose, lactose and others, either singly or in combination. As will be noted from the above table, corn syrup which contains some free water has been used as an ingredient in the binding agent without adverse effect on the moisture content of the food particles. This is in part due to the fact that small quantities of water contained in the binding agent will be driven off by the hot air blast from conduit 20 as it is introduced into the rotating pan. It is to be noted that the properties of the binding agent must be such that it solidifies at room temperature and can be held in a liquid state above room temperature.

While examples of the process of this invention have been cited, the process is not limited to these particular examples but can be accomplished using a wide variety of food particles and binding agents. Also, it is understood that the temperatures given in connection with all of the examples are only the preferred temperatures and can be varied as long as the desired results are not affected. Various other modifications of the process will be apparent to those skilled in the art without departing from the spirit and scope of the invention as defined in the appended claims.

What is claimed is:

1. A method of producing a confectionary base comprising agitating malted milk crunch in a rotating chamber while treating it with finely divided molten d-glucose monohydrate thereby forming agglomerates and removing the agglomerates from said chamber when they have reached the desired size.

2. A method of producing a confectionary base in the form of balls, comprising charging a rotating chamber with a quantity of malted milk crunch, alternately spraying said crunch with d-glucose monohydrate and adding more crunch to thereby bind the crunch into balls and removing the balls from the chamber as they attain the desired size.

3. A method of producing a confectionary base comprising agitating a quantity of malted milk crunch in a rotating chamber, spraying said crunch during agitation with an edible, molten substantially anhydrous binding agent consisting of sugars which can be maintained in a liquid state without decomposing to thereby form agglomerates and removing the agglomerates as they attain the desired size.

4. A method as defined in claim 3 including the step of treating said particles with a stream of hot air during agitation in said chamber.

5. A method of producing a confectionary base comprising agitating a quantity of malted milk crunch in a rotating chamber, spraying said crunch during agitation with molten d-glucose monohydrate at a temperature between 118 and 123 degrees centigrade and simultaneously treating said crunch with a stream of hot air at a temperature of 180 to 190 degrees centigrade and thereafter removing said crunch from said chamber.

6. A porous confectionary product consisting of particles of malted milk crunch bound together by a substantially anhydrous edible binding agent.

7. A porous confectionary product consisting of particles of malted milk crunch bound together by d-glucose monohydrate.

References Cited in the file of this patent

UNITED STATES PATENTS

| | | |
|---|---|---|
| 1,434,667 | Thompson | Nov. 7, 1922 |
| 1,851,988 | Scott | Apr. 5, 1932 |
| 1,930,527 | Manter | Oct. 17, 1933 |
| 2,339,418 | McKay | Jan. 18, 1944 |